Dec. 29, 1925.

1,567,402

C. J. VENN

TIRE MOLD

Filed May 17, 1922

Charles J. Venn,
Inventor,
By Delos G. Haynes,
Attorney

Patented Dec. 29, 1925.

1,567,402

UNITED STATES PATENT OFFICE.

CHARLES J. VENN, OF CHICAGO, ILLINOIS, ASSIGNOR TO CENTURY RUBBER WORKS, OF CICERO, ILLINOIS, A CORPORATION OF ILLINOIS.

TIRE MOLD.

Application filed May 17, 1922. Serial No. 561,554.

*To all whom it may concern:*

Be it known that I, CHARLES J. VENN, a citizen of the United States, and a resident of Chicago, Cook County, Illinois, have invented an Improvement in Tire Molds, of which the following is a specification.

This invention relates to molds, and with regard to certain more specific features, to molds for the manufacture of resilient tires.

Among the several objects of the invention may be noted the provision of a simple and inexpensive means for applying a suitable legend to a molded article such as a resilient tire; and the provision of a durable and effective construction permitting changing of the legend with a minimum of expense and time. Other objects will be in part obvious and in part pointed out hereinafter.

The invention accordingly consists of the elements and combinations of elements, features of construction, and arrangement of parts which will be exemplified in the structure hereinafter described and the scope of the application of which will be indicated in the following claims.

Figure 1:
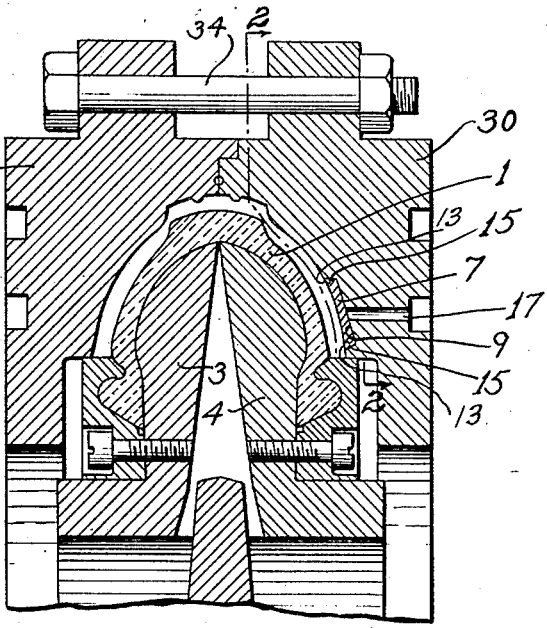
Figure 2:
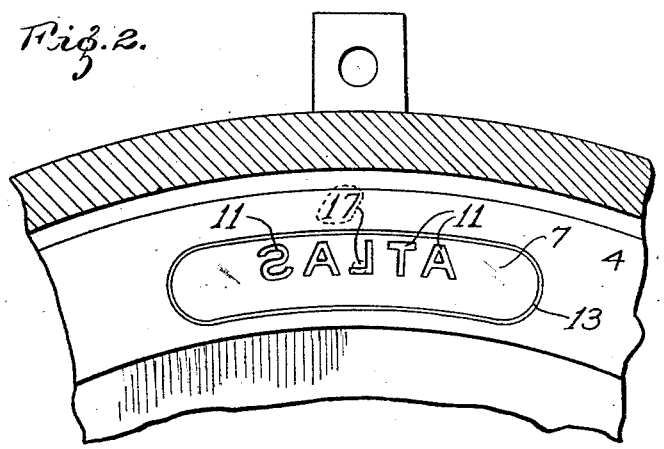

In the accompanying drawings, in which is illustrated one of various possible embodiments of the invention, Fig. 1 is a transverse section of a mold; and Fig. 2 is a section on the line 2—2 of Fig. 1.

Similar reference characters indicate corresponding parts throughout both views of the drawings.

Referring now more particularly to Fig. 1, there is illustrated at 1 a tire mounted on the two halves or sections 3, 4 of a core. The two halves 29, 30 of the mold surround the tire and are clamped together by bolts, one of which is shown at 34, passing through integral lugs on the mold halves.

The construction illustrated is taken from the mold shown in the patent to George H. Wheatley, 1,405,470, dated Feb. 7, 1922. The invention is not limited to this type of mold, however, and can be used on all or substantially all of the types of molds in commercial use today.

It is ordinarily desirable to have molded directly upon the article, such as a tire, a trade-mark or trade name, and/or the name of the manufacturer or distributor of the article. To this end, the present invention provides a plate 7 of appropriate contour to fit in a recess 9 in the mold. Upon this plate there are engraved the depressions 11 conforming to the desired legend, in this case the word Atlas. There is also a depression 13 around the edge of the plate.

The sides of the plate have a slight taper, which is shown somewhat exaggerated at 15 in Fig. 1.

When the plate is to be applied to the mold the plate is simply driven into the recess 9, the parts being proportioned to give a tight fit.

During the molding operation the rubber fills the depressions 11, 13, so that when the tire is complete, the tire bears the legend in raised letters, and has also raised upon it a border corresponding to the contour of the depression 13.

The provision of this depression 13 insures an ornamental border around the legend, and eliminates the ridge that would otherwise be formed in the rubber at the junction of plate and mold. Such a ridge would ordinarily be unsightly unless it were trimmed off, and such trimming would involve time and expense. The provision of the depression 13 thus turns what would be otherwise an item of expense, into an ornamental feature of the tire.

When the mold is to be used with some other legend, a small hole 17 is drilled inwardly from the outside of the mold, or this hole may be provided when the mold is first made. A pin or the like (not shown) is inserted in this hole 17 and is then driven toward the plate to drive the plate out of the recess 9. After this, a similarly constructed plate with some other legend may be inserted in the recess and the mold is again ready to use.

The above feature of replacement is of value when a mold is to be used for more than one legend, and is also of value when the legend on the plate that is in the mold becomes mutilated or for any other reason requires renewal.

From the above, it will be seen that the several objects of the invention are realized, and other advantageous results attained.

As various possible embodiments might be made of the above invention and as various changes might be made in the embodiment above set forth, it is to be understood that all matter herein set forth or shown in the accompanying drawings is to be interpreted as illustrative and not in a limiting sense.

I claim:

1. In apparatus of the class described, in combination, a mold for a resilient tire, a plate adapted to fit removably in said mold, a legend engraved upon the plate, a border engraved around the edge of the plate, whereby the engraved plate produces a raised legend upon the molded article, and the engraved border produces a raised border upon the article.

2. In apparatus of the class described, in combination, a mold for a resilient tire, a recess therein, a plate adapted to fit in said recess, a legend engraved upon the plate, a border engraved around the edge of the plate, the sides of the plate being tapered and adapted to have a driving fit in said recess, whereby the engraved plate produces a raised legend upon the molded article, and the engraved border produces a raised border upon the article eliminating the ridge that would otherwise be formed in the molded article at junction of plate and mold.

In testimony whereof, I have signed my name to this specification this 10th day of May, 1922.

CHARLES J. VENN.